Nov. 8, 1938.   B. M. LEECE   2,135,977

REGULATING DEVICE

Filed May 1, 1936

INVENTOR.
BENNETT M. LEECE
BY
*Lewis, Hudson & Kent*
ATTORNEYS.

Patented Nov. 8, 1938

2,135,977

UNITED STATES PATENT OFFICE 2,135,977

REGULATING DEVICE

Bennett M. Leece, Shaker Heights, Ohio, assignor to The Leece-Neville Company, Cleveland, Ohio, a corporation of Ohio Application May 1, 1936, Serial No. 77,372

2 Claims. (Cl. 171—229)

This invention relates to generator control apparatus, and more particularly to control apparatus which is especially applicable to the generators of battery charging and lighting systems of motor vehicles.

An object of this invention is to provide improved generator control apparatus embodying a novel regulating device.

Another object of the invention is to provide improved generator control apparatus wherein a regulator is operated by stray or leakage flux of another generator control device.

Still another object of this invention is to provide improved generator control apparatus comprising a magnetically operated cut-out switch and a vibratory regulator operated by flux of the cut-out.

Yet another object of this invention is to provide improved apparatus for controlling generator circuits, comprising a reverse current cut-out having a movable armature cooperating with a magnet core, and a regulator controlling the ampere turns of the generator field and having a vibratory armature cooperating with an extension part of the magnet core.

Other objects and advantages of the invention will be apparent from the following description, when taken in conjunction with the accompanying sheet of drawing, wherein Fig. 1 is a wiring diagram illustrating generator control means embodying my invention.

Figures 1, 2, 3:
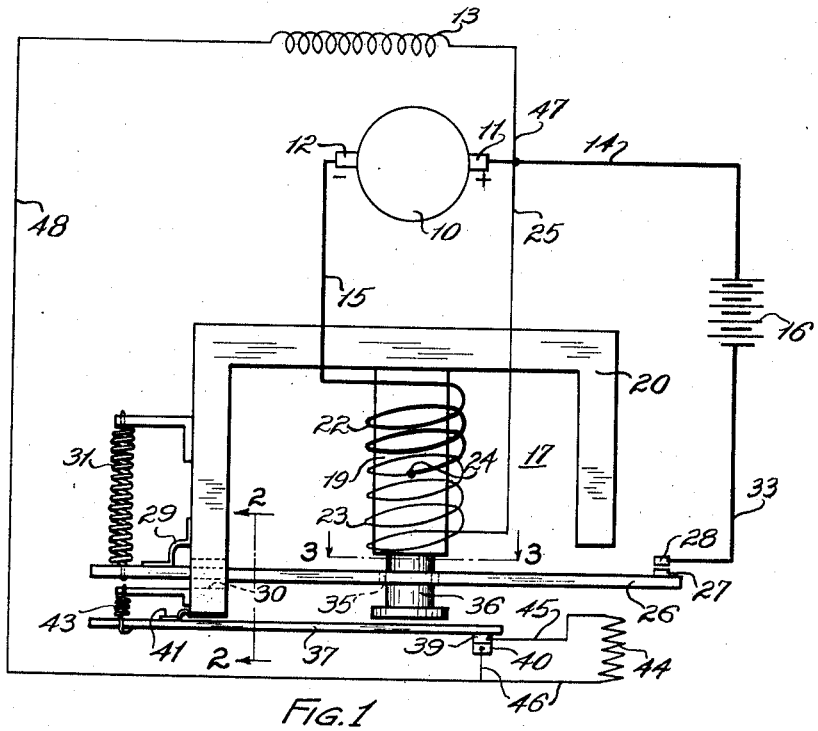
Fig. 2 is a partial transverse sectional view taken on line 2—2 of Fig. 1.
Fig. 3 is a partial sectional view taken on line 3—3 of Fig. 1.

In the accompanying drawing, to which more detailed reference will presently be made, I have shown one form of my improved generator control means. As mentioned above, my improved control means is applicable to the generators of battery charging and lighting systems of motor vehicles, and although particular reference is made to this type of system in disclosing my invention, it should be understood that the invention is applicable to various other generating systems and electrical apparatus.

In Fig. 1 of the drawing I show an electrical system which includes a generator 10 having brushes 11 and 12 and a shunt field winding 13. Load conductors 14 and 15 are connected with the brushes 11 and 12 and constitute a part of a load circuit which includes a storage battery 16.

My improved generator control means is in the form of a device 17 commonly known as a cut-out switch or a reverse current cut-out. As is well understood in the art, such a cut-out is commonly used in the load circuit of a generator for automatically opening the circuit to prevent the battery discharging back through the generator after the latter has been stopped.

The cut-out 17 shown in this instance is provided with a magnetizable core 19 which includes a support or frame 20. This cut-out is also provided with magnet coils 22 and 23 which are disposed around the core 19 in additive relation to each other. The coil 22 is a series coil having one end thereof connected with the brush 12 by the load conductor 15, and its other end connected with one end of the coil 23 and also grounded on the magnet core, as indicated at 24. The coil 23 is a voltage coil which is connected across the brushes of the generator by reason of its one end being connected with the outer end of the series coil 22, and its other end being connected with the brush 11 by the conductor 25.

The cut-out is also provided with a movable armature 26 which cooperates with the magnet core 19 and causes opening and closing of a pair of contacts 27 and 28. The armature 26 may be movably mounted on the frame 20, as by means of an electrically-conducting resilient hinge element 29. The end of the armature with which the hinge element 29 is connected may extend through an opening 30 of the frame 20 and may have a tension spring 31 connected therewith. The spring 31 acts on the armature to normally swing the same away from the core 19, or, in other words, in a direction to open the contacts 27 and 28.

The contact 27 is carried by the armature 26 and is electrically connected with the outer end of the series coil 22 through the armature and the core of the magnet. The contact 28 is suitably supported to be engaged by the contact 27, upon movement of the armature in opposition to the spring 31, and is connected with one terminal of the battery 16 by means of the load conductor 33. It will thus be seen that the contacts 27 and 28 are included in the load circuit of the generator.

According to my invention I utilize stray or leakage flux of the cut-out 17 to operate a regulator for the generator. This desired result can be accomplished in various ways and, as an illustration of what I regard to be a suitable arrangement for this purpose, I show the armature 26 of the cut-out as having an opening 35 and the magnet core 19 as having an extension part 36 which projects through the opening of the armature. The regulator may include a vibratory armature 37 which cooperates with the core extension 36 and causes opening and closing of a pair of contacts 39 and 40. The armature 37 may be mounted on the frame 20 of the cut-out by means of an electrically-conducting flexible hinge element 41 and may have a tension spring 43 connected therewith to normally swing the armature away from the core extension 36 and in a direction to cause closing of the contacts 39 and 40.

The contact 39 is carried by the armature 37 of the regulator and is electrically connected with the generator brush 12 through the armature, the magnet core and the series coil 22. The contact 40 is suitably supported to be engaged by the contact 39 when the armature 37 is moved away from the core extension 36 by the spring 43.

The regulator exercises a control function on the generator by operating to vary the ampere turns of the shunt field winding 13. For this purpose I provide the regulator with a resistor 44, of suitable value, which is connected across the contacts 39 and 40 by conductors 45 and 46. One end of the shunt field winding 13 is connected with the load conductor 14 by a conductor 47 and the outer end of this field winding is connected with the stationary contact 40 by a conductor 48 and a portion of the conductor 46.

In the operation of the system illustrated and described it will be seen that when the generator 10 is started the magnet coils 22 and 23 will be energized by reason of their being connected across the brushes of the generator by the conductors 15 and 25. Energization of these coils causes the core 19 to be magnetized, resulting in the armature 26 closing the contacts 27 and 28. The closing of these contacts closes the load circuit of the generator to cause charging of the battery 16. The magnetization of the core 19 also causes a rapid vibratory movement of the armature 37 of the regulator. This action of the regulator armature opens and closes the contacts 39 and 40 and causes the resistor 44 to be intermittently connected into and short-circuited out of the circuit of the shunt field winding 13. As long as the generator continues in operation the contacts 27 and 28 of the cut-out remain closed and the regulator is operated by flux from the magnet of the cutout. When the generator is stopped the core 19 is demagnetized, which results in opening of the contacts 27 and 28 and prevents discharge of the battery 16 back through the generator. Since the regulator is operated by flux produced by a series coil of the generator load circuit, the regulating action obtained is essentially a current regulation.

From the foregoing description and the accompanying drawing it will now be readily understood that I have provided an improved generator control device which is of very simple construction, yet very efficient and reliable in operation It will be understood further that this device embodies both a reverse current cut-out and a regulator for the generator, and since the regulator is operated by stray or leakage flux of the cut-out it will be apparent that the use of this combined device eliminates the additional device and circuit connections heretofore required to obtain regulation of the generator.

While I have illustrated and described the improved control means of my invention, it will be understood, of course, that I do not wish to be limited to the precise apparatus and circuit arrangements illustrated and described, but regard my invention as including such changes and modifications as do not constitute a departure from the spirit of the invention and the scope of the appended claims.

Having thus described my invention I claim:

1. In combination, a generator having a shunt field winding and a load circuit, an electromagnet having a frame provided with spaced arms and a core disposed between and extending in the direction of said arms and also having a coil on said core adapted to be energized from the generator, a pair of movable switch members one extending transversely past said core and adjacent both arms of the frame and adapted to be actuated by flux traversing both arms, and the other extending transversely past said core and one arm of the frame and adapted to be actuated by flux traversing only said one arm, contacts associated with each switch member to be opened and closed by the operation thereof, and means controlled by the contacts of said other switch member for varying the ampere turns of the shunt field.

2. In combination, a generator having a shunt field winding and a load circuit, an electromagnet having a frame provided with spaced arms and a core disposed between and extending in the direction of said arms and also having a coil on said core adapted to be energized from the generator, a pair of movable switch members one extending transversely adjacent both arms of the frame and having an opening through which said core projects and the other extending transversely adjacent one arm of the frame and the projecting portion of the core, contacts associated with each switch member to be opened and closed by the operation thereof, and means controlled by the contacts of said other switch member for varying the ampere turns of the shunt field.

BENNETT M. LEECE.